United States Patent
Kim et al.

(10) Patent No.: US 8,634,337 B2
(45) Date of Patent: Jan. 21, 2014

(54) METHOD FOR RECEIVING CONTROL INFORMATION AND TERMINAL DEVICE USING THE SAME

(75) Inventors: Jeong Ki Kim, Anyang-si (KR); Young Soo Yuk, Anyang-si (KR); Su Nam Kim, Anyang-si (KR); Jin Soo Choi, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 13/141,319

(22) PCT Filed: Dec. 21, 2009

(86) PCT No.: PCT/KR2009/007635
§ 371 (c)(1),
(2), (4) Date: Jun. 21, 2011

(87) PCT Pub. No.: WO2010/071385
PCT Pub. Date: Jun. 24, 2010

(65) Prior Publication Data
US 2011/0255499 A1 Oct. 20, 2011

Related U.S. Application Data

(60) Provisional application No. 61/139,622, filed on Dec. 21, 2008.

(51) Int. Cl.
*H04H 20/71* (2008.01)

(52) U.S. Cl.
USPC ......................................... 370/312

(58) Field of Classification Search
USPC ......... 370/229–231, 235, 236, 310, 351, 389, 370/390, 392, 431, 432, 912, 913, 312
See application file for complete search history.

(56) References Cited

U.S. PATENT DOCUMENTS

| | | | |
|---|---|---|---|
| 2007/0286127 A1* | 12/2007 | Inohiza | 370/331 |
| 2008/0273454 A1* | 11/2008 | Malkamaki et al. | 370/216 |
| 2009/0017843 A1* | 1/2009 | Laroia et al. | 455/458 |
| 2009/0316806 A1* | 12/2009 | Cheng et al. | 375/260 |
| 2011/0255499 A1* | 10/2011 | Kim et al. | 370/329 |

FOREIGN PATENT DOCUMENTS

| | | |
|---|---|---|
| KR | 10-0770865 | 10/2007 |
| KR | 10-0867987 | 11/2008 |

* cited by examiner

*Primary Examiner* — Omar Ghowrwal
(74) *Attorney, Agent, or Firm* — Lee, Hong, Degerman, Kang & Waimey

(57) ABSTRACT

Disclosed are a method for receiving control information and a terminal device using the same. The terminal is able to receive a non-user-specific A-MAP IE of a specific sub-frame from a base station according as a broadcasting message is transmitted from the specific sub-frame, wherein the non-user-specific A-MAP IE includes an indicator showing that the non-user-specific A-MAP IE is configured in an extended form. The terminal can also obtain scheduling information based on the received indicator, wherein the scheduling information is configured by the type of the extended non-user-specific A-MAP IE. Then, the terminal is capable of decoding the broadcast message in a certain sub-frame based on the obtained scheduling information.

10 Claims, 8 Drawing Sheets

| A-MAP | A-MAP | A-MAP | A-MAP | | | | |
|---|---|---|---|---|---|---|---|
| DL SF 0 | DL SF 1 | DL SF 2 | DL SF 3 | UL SF 4 | UL SF 5 | UL SF 6 | UL SF 7 |

METHOD FOR RECEIVING CONTROL INFORMATION AND TERMINAL DEVICE USING THE SAME

CROSS-REFERENCE TO RELATED APPLICATIONS

This application is a 371 U.S. national stage application of International Application No. PCT/KR2009/007635, filed on Dec. 21, 2009, which claims priority to U.S. Provisional Application Ser. No. 61/139,622, filed on Dec. 21, 2008, the contents of which are incorporated by reference herein in their entirety.

TECHNICAL FIELD

The present invention relates to a wireless communication system, and more particularly, to a method for receiving control information at a mobile station (MS).

BACKGROUND ART

In a conventional wireless communication system using IEEE 802.16e standard, various kinds of broadcasting messages were used. Types of conventional broadcasting messages and information including the broadcasting messages will now be briefly described.

A Downlink Channel Descriptor (DCD) is a Media Access Control (MAC) management message which transmits system information regarding a downlink channel. A MS may receive the DCD and decode downlink burst. An Uplink Channel Descriptor (UCD) is a MAC management message which transmits system information regarding an uplink channel. The MS receives the UCD and then starts transmission of a signal to the uplink channel. 'MOB-TRF-IND' is a MAC management message which indicates whether there is downlink traffic that will be transmitted to MSs in a sleep mode and 'MOB-PAG-ADV' is a MAC management message which indicates whether there is downlink traffic that will be transmitted to MSs in an idle mode. Further, 'MOB-NBR-ADV' is a message which advertises system information of neighboring base stations, 'LBS-ADV' is a message which advertises Location Based Service (LBS) information, and 'Service Identify Information Advertisement (SII-ADV)' is a broadcasting message which advertises service ID information.

Downlink control channels in an IEEE 802.16m system are briefly described. The downlink control channels contain information necessary for operation of the IEEE 802.16m system. Information on the downlink control channels are hierarchically transmitted on different time scales from a super frame level to an Advanced Air Interface (AAI) subframe level. In a wireless MAN-OFDMA/Advanced Air Interface) operation, a MS is able to access the system without decoding wireless MAN-OFDMA FCH and MAP messages.

A Super Frame Header (SFH), one of the downlink control channels, is transmitted in a state of including necessary system parameters and system configuration information. Particularly, the SFH carries system information necessary for a MS to enter a network. The SFH includes a Primary Super Frame Header (P-SFH) and a Secondary Super Frame Header (S-SFH). The P-SFH is transmitted for each super frame. The S-SFH may be also transmitted for each super frame. The SFH is also called a Broadcast Cannel (BCH) (broadcast channel includes a Primary Broadcast Channel (P-BCH) and a Secondary Broadcast Channel (S-BCH)) and the SFH and BCH are used as terms having the same meaning.

Advanced MAP (A-MAP) carries unicast service control information. The unicast service control information is largely divided into user-specific control information and non-user specific control information. The user-specific control information includes assignment information, HARQ feedback information, and power control information, which are respectively transmitted in an assignment A-MAP, HARQ feedback A-MAP, and power control A-MAP.

FIG. 1 illustrates exemplary positions of A-MAP regions allocated in a frame structure in an IEEE 802.16m system.

FIG. 1 shows A-MAP allocation positions in one frame in the IEEE 802.16m system. Particularly, FIG. 1 shows a case in which the ratio of the number of downlink subframes to the number of uplink subframes is 4:4 in a single frame in a frame structure using Time Division Duplex (TDD). All of A-MAPs in one frame share a region of physical resources, which is called an A-MAP region. The A-MAP region is located in every downlink subframe. Downlink data corresponding to control information included in the A-MAP region may be assigned to resource regions in the subframes corresponding to the A-MAP region.

FIG. 2 shows the structure of an A-MAP region in an IEEE 802.16m system.

Referring to FIG. 2, an A-MAP region 210 includes a non-user specific A-MAP 220, HARQ feedback A-MAP 230, power control A-MAP 240, and assignment A-MAP 250. A non-user specific A-MAP Information Element (IE) is comprised of information that is not assigned to a specific user or users of a specific group, that is, information transmitted to every MS. The HARQ feedback A-MAP 230 includes control information regarding re-transmission request and the power control A-MAP 240 includes power control information for uplink power control of a MS. An assignment A-MAP IE includes information for decoding.

The number of assignment A-MAPs in each assignment A-MAP group is designated by the non-user specific A-MAP IE 220. The assignment A-AMP 250 includes resource assignment information classified into various types of resource assignment IEs (assignment A-MAP IEs). The assignment A-MAP IEs are individually coded and transmitted in a state of including information for one user or users of one group. The assignment A-MAP IEs will be transmitted as minimum LRUs in one minimum LRU A-MAP region 210.

The number of Logically Contiguous MLRUs is determined based on the size of an assignment IE and a channel coding rate and the channel coding rate is selected based on the link condition of a MS. The assignment A-MAPs 250 are grouped based on a modulation and coding selection level and the size of an A-MAP IE. Each assignment A-MAP group includes multiple logically contiguous MLRUs and the number of assignment A-MAPs 250 in each assignment A-MAP group is delivered by the non-user specific A-MAP 220.

As shown in FIG. 2, the A-MAP region 210 in the A-MAP region structure included in one frequency partition is comprised of LAMAP distributed Logical Resource Units (LRUs) configured by Physical Resource Units (PRUs) of symbols) of $N_{sym}$ symbols.

When an idle mode MS wants to know whether a paging message is transmitted from the A-MAP information shown in FIGS. 1 and 2, the MS has to read scheduling information in every subframe during a paging listening interval. Further, a sleep mode MS has to perform an operation of reading scheduling information in every subframe during a sleep listening interval if the MS wants to know whether a traffic indication (TRF-IND) message is transmitted. Accordingly, if the MS in the idle or sleep mode checks whether a broadcasting message is transmitted through A-MAP, overhead according to decoding of all scheduling information regarding the MS considerably increases.

DISCLOSURE

Technical Problem

An object of the present invention devised to solve the problem lies on a method of receiving control information at a mobile station (MS).

Another object of the present invention devised to solve the problem lies on a MS apparatus which receives control information.

It will be appreciated by person skilled in the art that the objects that could be achieved with the present invention are not limited to what has been particularly described hereinabove and the above and other objects that the present invention could achieve will be more clearly understood from the following detailed description.

Technical Solution

The objects of the present invention can be achieved by providing a method of receiving control information at a mobile station (MS), which includes: receiving a non-user specific A-MAP Information Element (IE) of a specific subframe, which includes an indicator indicating that the non-user specific A-MAP IE is configured in an extended type from a base station (BS) when a broadcasting message is transmitted in the specific subframe; acquiring scheduling information configured in the extended type of the non-user specific A-MAP IE based on the received indicator; and decoding the broadcasting message in the specific subframe using the acquired scheduling information.

In another aspect of the present invention, provided herein is a MS apparatus including a receiving module receiving a non-user specific A-MAP IE of a specific subframe, which includes an indicator indicating that the non-user specific A-MAP IE is configured in an extended type, from a base station when a broadcasting message is transmitted in the specific subframe; a scheduling information acquisition module for acquiring scheduling information configured in the extended type of the non-user specific A-MAP IE based on the received indicator; and a decoding module for decoding the broadcasting message in the specific subframe using the acquired scheduling information.

Advantageous Effects

According to the present invention, the base station includes a broadcasting message indicator or a non-user specific A-MAP extension flag in a non-user specific A-MAP in the A-MAP region and transmits the non-user specific A-MAP to the MS, and thus the MS is able to quickly know whether a broadcasting message is transmitted in the current subframe.

It will be appreciated by persons skilled in the art that the effects that could be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figures 1, 2:
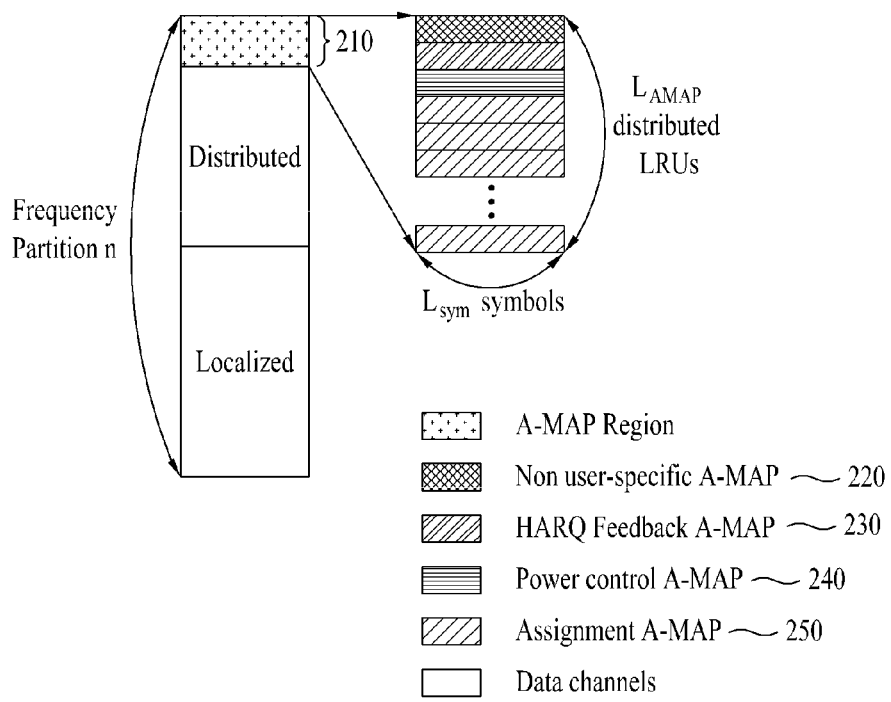
FIG. 1 shows exemplary positions to which an A-MAP region is allocated in a frame structure in an IEEE 802.16m system.
FIG. 2 shows the structure of an A-MAP region in an IEEE 802.16m system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, while the following detailed description is given under the assumption that an IEEE 802.16 system is being used as mobile communication system, the description is applicable to any other mobile communication system except for specific feature inherent to the IEEE 802.16 system.

In some instances, known structures and devices are omitted, or are shown in block diagram form focusing on important features of the structures and devices, so as not to obscure the concept of the present invention. The same reference numbers will be used throughout this specification to refer to the same or like parts.

Furthermore, the following description is made under the assumption that a mobile station (MS) is a mobile or fixed user device such as Advanced Mobile Station (AMS), User Equipment (UE), mobile terminal, etc. and a base station (BS) is an arbitrary node on a network, which communicates with a MS, such as Node B, eNode B, Access Point (AP).

In a mobile communication system, an AMS may receive information from a base station on a downlink and transmit information to the base station on an uplink. The information that the AMS transmits or receives includes data and various types of control information. There are many physical channels according to the types and usages of information that the AMS transmits or receives. An Advanced Air Interface (AAI) subframe used in the present invention means a structured data sequence of a predetermined duration used by AAI and may be also called a subframe.

A method of transmitting scheduling information regarding a broadcasting message from the base station such that an idle or sleep mode AMS is able to efficiently read the broadcasting message will now be described.

An AMS in an idle mode or sleep mode needs to receive a paging message or a traffic indication message ('TRF-IND' message). To check whether the paging message or traffic indication message is transmitted in a specific subframe, the AMS needs to decode a non-user specific A-MAP for every subframe. The non-user specific A-MAP may include a broadcasting message indicator that indicates whether the paging message, traffic indication message or other broadcasting messages are transmitted in a predetermined subframe. Accordingly, the base station may transmit the non-user specific A-MAP including the broadcasting message indicator that indicating whether the broadcasting message is transmitted in the current subframe to the AMS in a downlink subframe.

The term 'broadcasting message indicator' used in the present invention may be replaced with a non-user specific A-MAP extension flag. That is, the broadcasting message indicator (or non-user specific A-MAP extension flag) may indicate whether the non-user specific A-MAP is transmitted in an extended form of the non-user specific A-MAP to the AMS. More specifically, in a case that the base station transmits the broadcasting message in the current subframe, if the broadcasting message indicator included in the non-user specific A-MAP is set to a specific value (or a non-user specific A-MAP extension flag is set), the specific value may indicate that the base station transmits the broadcasting message in the current subframe and scheduling information regarding the broadcasting message is configured in the extended form of the non-user specific A-MAP and transmitted.

The AMS in the idle or sleep mode first checks whether the broadcasting message indicator included in the non-user specific A-MAP in a specific subframe has been set. If the broadcasting message indicator has been set to 0, the AMS may determine that the broadcasting message including the paging message or traffic indication message is not transmitted in the specific subframe, stop the operation of reading the broadcasting message, and check the next subframe.

If additional scheduling information such as assignment A-MAP is transmitted in a specific subframe in which a broadcasting message is transmitted, the broadcasting message indicator included in the non-user specific A-MAP indicates that the scheduling information regarding the broadcasting message is transmitted in an A-MAP region of the specific subframe. For example, if the broadcasting message indicator of the non-user specific A-MAP is set to 0, the broadcasting message indicator indicates that the broadcasting message is not transmitted in the current subframe. Thus, the scheduling information for the broadcasting message is not included in the A-MAP region and transmitted. The scheduling information for the broadcasting message includes resource allocation information, etc. regarding the broadcasting message.

Table 1 shows an exemplary non-user specific A-MAP according to the present invention.

TABLE 1

| Syntax | Size (Bit) | Notes |
|---|---|---|
| Non-user specific A-MAP IE ( ) { | | |
| Assignment A-MAP IEs size | Variable | |
| Broadcast message indicator | 1 | Broadcasting message indicator indicates whether one or more broadcasting messages are transmitted in the current subframe. For example, 0b0 indicates that any broadcasting message is not transmitted in the current subframe. Accordingly, scheduling information for broadcasting message transmission is not included in an A-MAP region of the subframe. |
| } | | |

Referring to Table. 1, the base station may transmit a non-user specific A-MAP IE including the broadcasting message indicator to the AMS. Here, the broadcasting message indicator included in the non-user specific A-MAP IE may be 1 bit. The broadcasting message indicator may inform the AMS whether the broadcasting message is transmitted through the current subframe. For example, when the broadcasting message indicator is set to 0, the AMS may determine that any broadcasting message is not transmitted in the current subframe.

Figure 3:
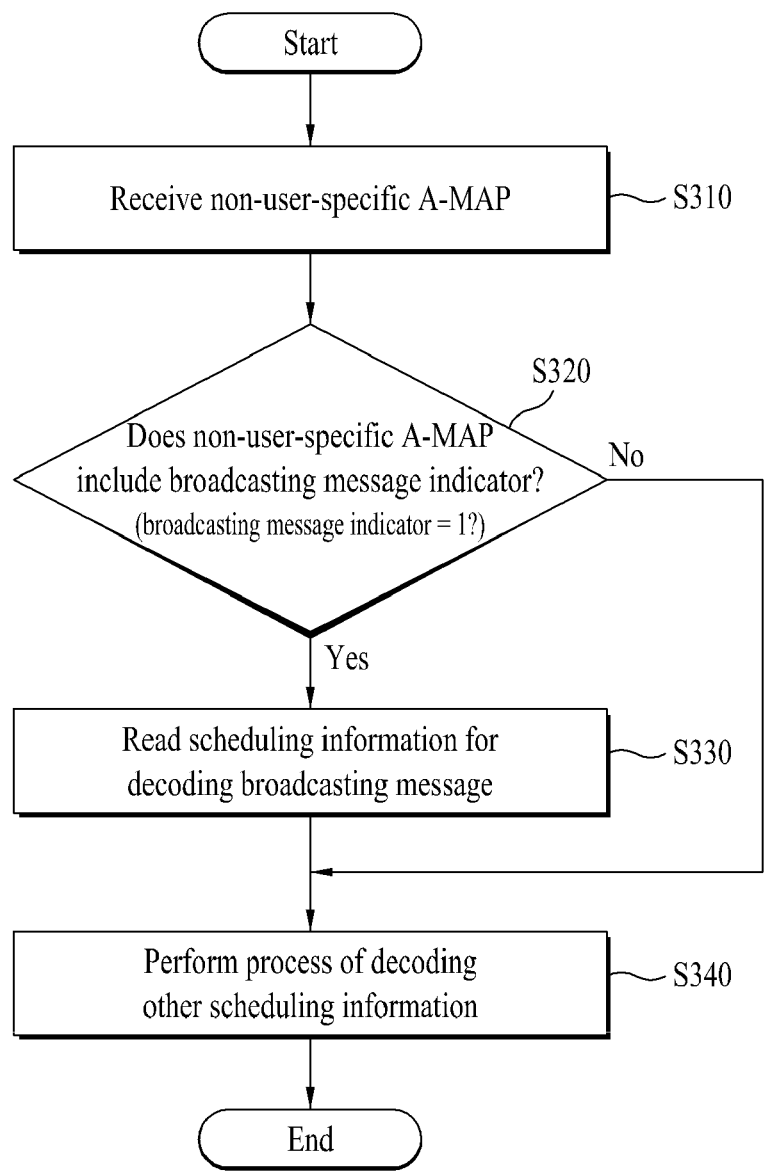
FIG. 3 is a flowchart illustrating an operation in which an active mode AMS receives a scheduling message (for example, assignment A-MAP IEs) by using a broadcasting message indicator included in a non-user specific A-MAP.

FIG. 3 is a flowchart illustrating an exemplary operation in which an active mode AMS receives a scheduling message (for example, assignment A-MAP IEs) using a broadcasting message indicator included in a non-user specific A-MAP.

Referring to FIG. 3, the active mode AMS receives a non-user specific A-MAP from a base station (S310). Then, the active mode AMS determines whether the non-user specific A-MAP includes the broadcasting message indicator (S320). If the received non-user specific A-MAP includes the broadcasting message indicator (for example, if the broadcasting message indicator indicates 1), the active mode AMS determines that the broadcasting message is transmitted in a corresponding subframe and starts to read scheduling information for decoding the broadcasting message in a designated position (S330). Upon completion of reading the scheduling information for decoding the broadcasting message, the active mode AMS reads other scheduling information (for example, assignment A-MAP IEs (DL/UL basic A-MAP IE, GRA/PA A-MAP IEs, etc.) (S340). However, if the received non-user specific A-MAP does not include the broadcasting message indicator (for example, if the broadcasting message indicator is set to 0), the active mode AMS determines that the broadcasting message is not transmitted in the corresponding subframe and directly performs a process of reading other scheduling information without reading the scheduling information regarding the broadcasting message (S340).

Figure 4:
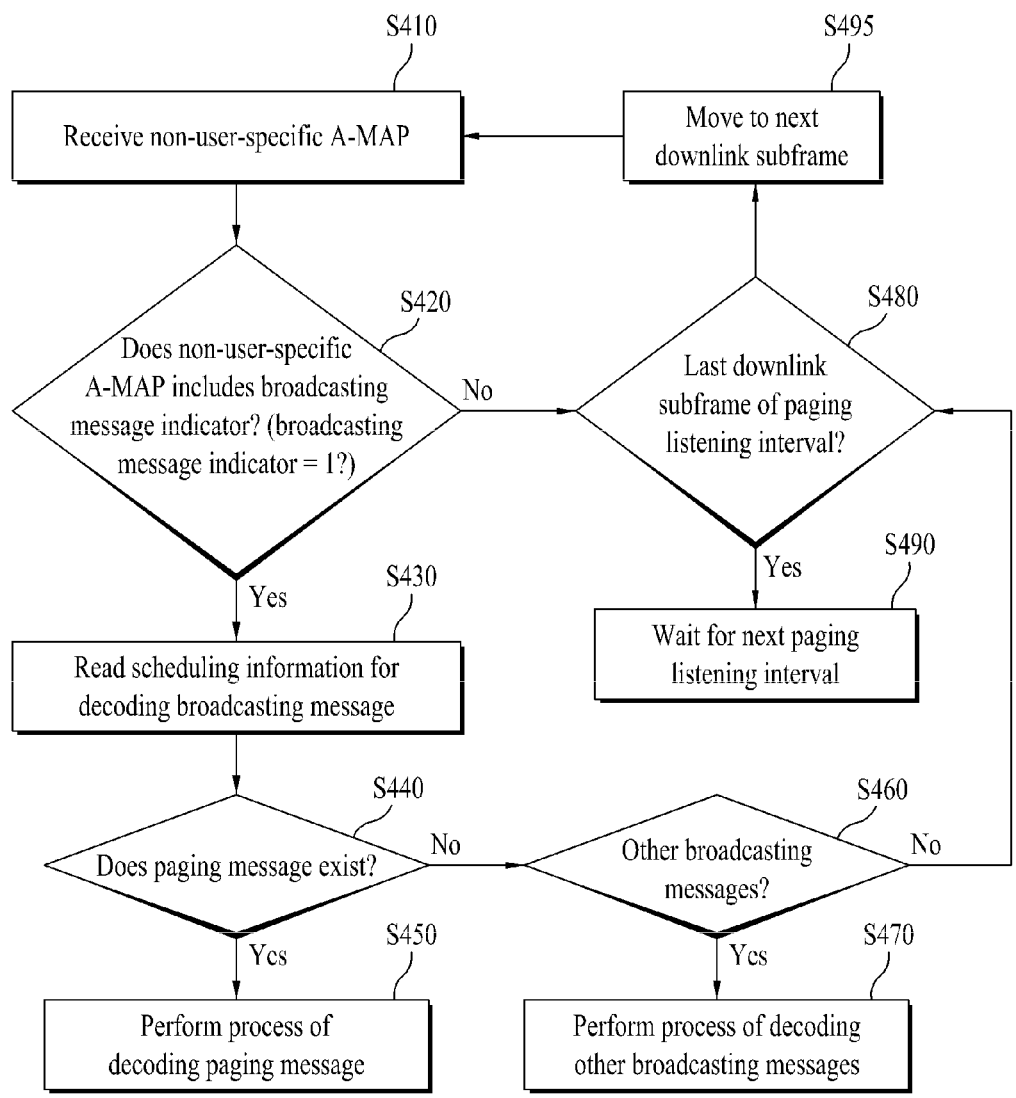
FIG. 4 is a flowchart illustrating an operation in which an idle mode AMS receives a broadcasting message including a paging message by using a broadcasting message indicator included in a non-user specific A-MAP during a paging listening interval corresponding to the idle mode MS.

FIG. 4 is a flowchart illustrating an exemplary operation in which an idle mode AMS receives a broadcasting message including a paging message by using a broadcasting message indicator included in a non-user specific A-MAP during a paging listening interval corresponding to the idle mode AMS.

Referring to FIG. 4, the idle mode AMS receives the non-user specific A-MAP from the base station (S410). The idle mode AMS determines whether the non-user specific A-MAP includes the broadcasting message indicator (for example, whether the broadcasting message indicator is set to 1) when receiving the non-user specific A-MAP during the paging listening interval corresponding the idle mode AMS (420). If the received non-user specific A-MAP includes the broadcasting message indicator (for example, the broadcasting message indicator is set to 1), the idle mode AMS reads scheduling information for decoding the broadcast message (S430).

Then, the idle mode AMS checks whether the broadcasting message includes the paging message (S440). If the broadcasting message includes the paging message, the idle mode AMS reads the paging message (S450). On the contrary, if the broadcasting message does not include the paging message, the idle mode AMS checks if there are other broadcasting messages (S460). If there are other broadcasting messages, the idle mode AMS decodes the other broadcasting messages (S470).

If the non-user specific A-MAP does not include the broadcasting message indicator (S420) or the other broadcasting messages do not exist (S460), the idle mode AMS determines that the other broadcast messages including the paging message are not transmitted in the corresponding subframe and checks if the corresponding subframe is the last downlink subframe of the paging listening interval (S480). Here, if the corresponding subframe is the last downlink subframe of the paging listening interval, the idle mode AMS waits for the next paging listening interval (S490). If the corresponding subframe does not correspond to the last paging listening interval, however, the idle mode AMS moves to the next downlink subframe of the corresponding paging listening interval and receives a non-user specific A-MAP for decoding the corresponding paging message again (S495).

Figure 5:
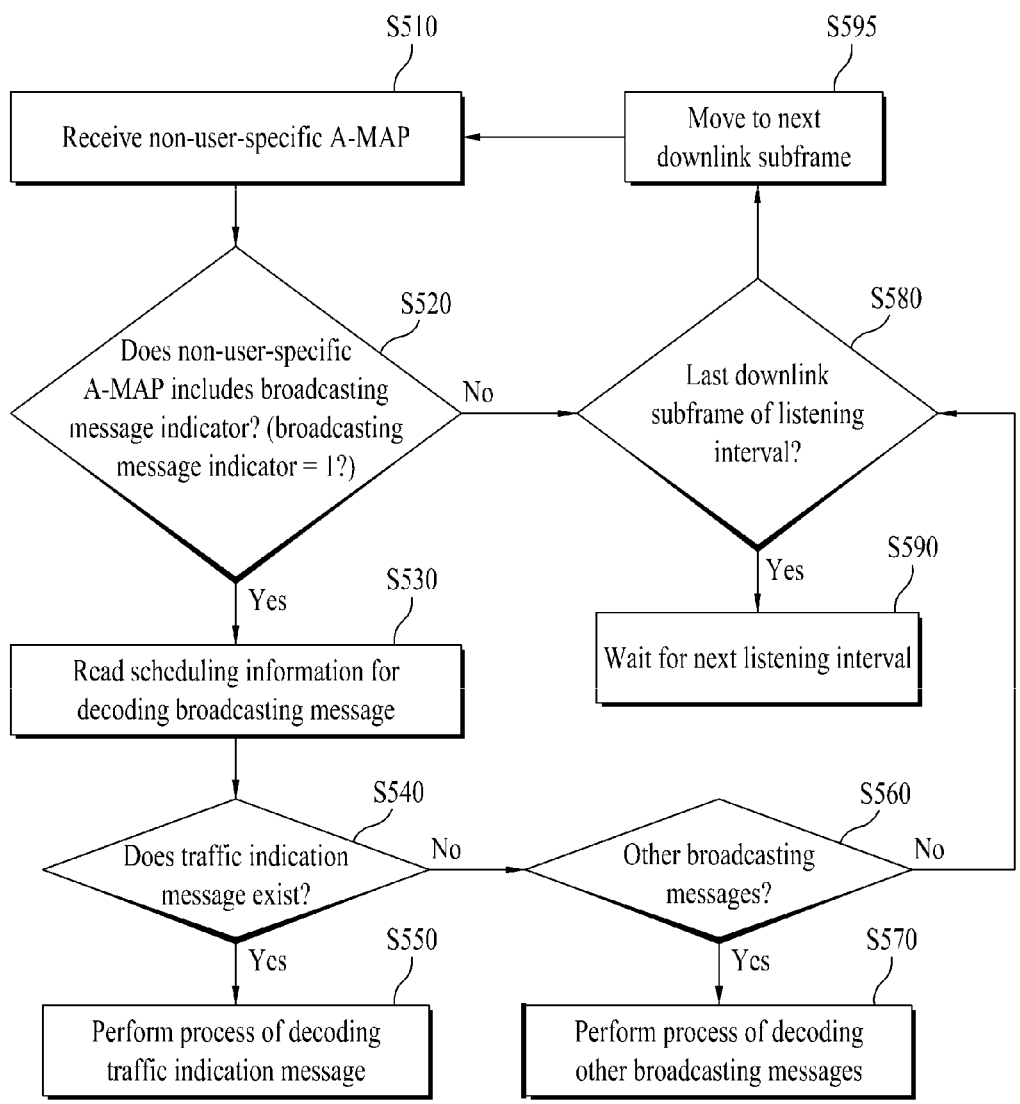
FIG. 5 is a flowchart illustrating an operation in which a sleep mode AMS receives a broadcasting message including a traffic message by using a broadcasting message indicator included in a non-user specific A-MAP during a listening interval corresponding to the sleep mode AMS.

FIG. 5 is a flowchart illustrating an exemplary operation in which a sleep mode AMS receives a broadcasting message including a traffic indication message by using a broadcasting message indicator included in a non-user specific A-MAP during its listening interval.

Referring to FIG. 5, the sleep mode AMS receives the non-user specific A-MAP from the base station (S510). The sleep mode AMS determines whether the non-user specific A-MAP includes the broadcasting message indicator (whether the broadcasting message indicator is set to 1, for example) when receiving the non-user specific A-MAP during the listening interval corresponding to the sleep mode AMS (S520). If the received non-user specific A-MAP includes the broadcasting message indicator (for example, if the broadcasting message indicator is set to 1), the sleep mode AMS reads scheduling information for decoding the broadcasting message (S530).

Then, the sleep mode AMS checks if the broadcasting message includes a traffic indication message (S540). If the broadcasting message includes the traffic indication message, the sleep mode AMS reads the traffic indication message AAI-TRF-IND (S550). On the contrary, if the broadcasting message does not include the traffic indication message, the sleep mode AMS checks if there are other broadcasting messages (S560). If the other broadcasting messages exist, the sleep mode AMS decodes the broadcasting messages (S570).

If the non-user specific A-MAP does not include the broadcasting message indicator (S520) or the other broadcast messages do not exist (S560), the sleep mode AMS determines that the other broadcast messages including the traffic indication message are not transmitted in the corresponding subframe and checks if the corresponding subframe is the last downlink subframe of the listening interval (S580). If the corresponding subframe is the last downlink subframe of the listening interval, the sleep mode AMS waits for the next listening interval. On the contrary, if the corresponding subframe does not correspond to the last downlink subframe, the sleep mode AMS moves to the next downlink subframe of the corresponding listening interval and receives a non-user specific A-MAP for decoding the traffic indication message again (S595).

Figure 6:
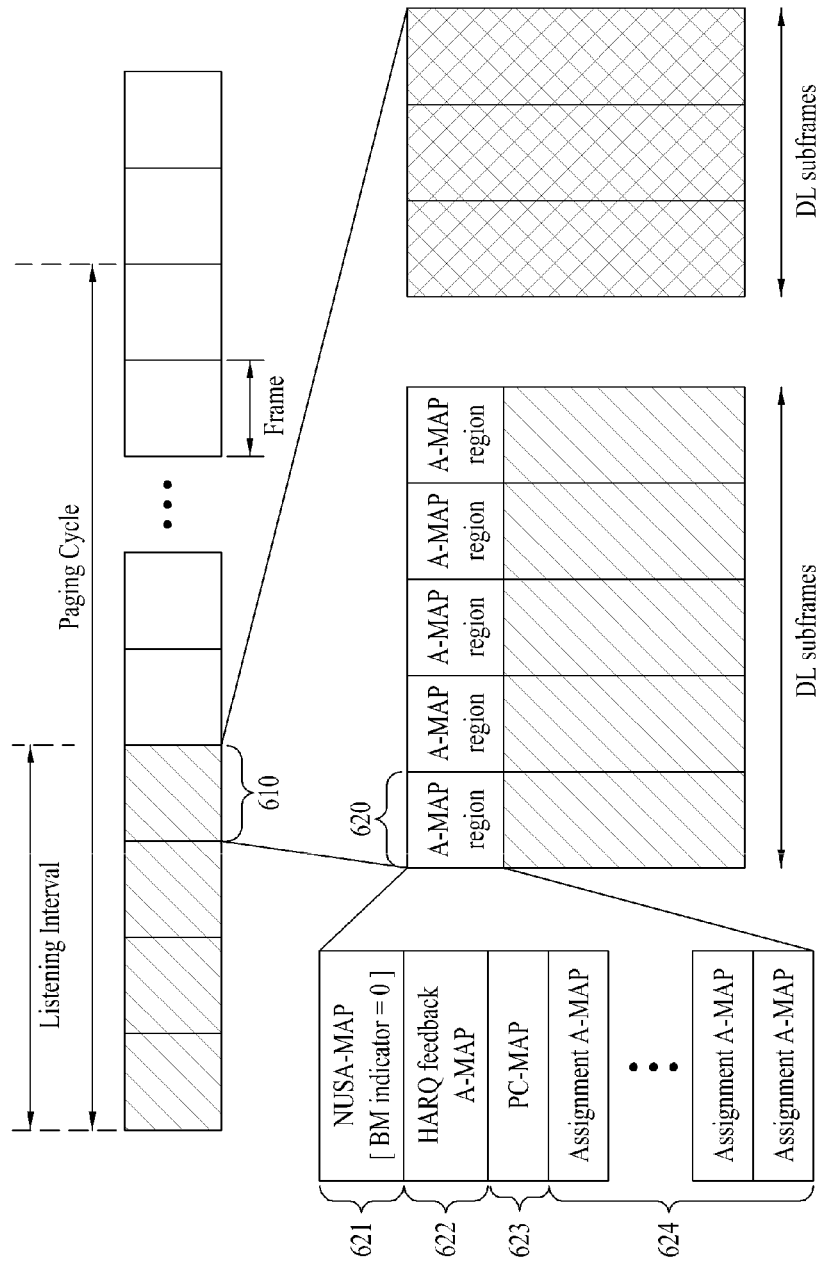
FIG. 6 shows an exemplary structure of a non-user specific A-MAP including a broadcasting message indicator.

FIG. 6 shows an exemplary structure of a non-user specific A-MAP including a broadcasting message indicator.

Referring to FIG. 6, a frame in which an idle mode AMS receives a paging message may be a fourth frame 610 in a paging listening period corresponding to the AMS. An A-MAP region 620 of a specific subframe includes a non-user specific A-MAP 621, a HARQ feedback A-MAP 622, a power control A-MAP 623, and assignment A-MAPs 624.

Since the broadcasting message indicator is set to 0 in the non-user specific A-AMP 621, the corresponding subframe does not include a broadcasting message, which means that the A-MAP region 620 does not include scheduling information (assignment A-MAP IE or other structures) for broadcasting message transmission. Because the idle or sleep mode AMS can be informed that the broadcasting message indicator is set to 0 when reading the non-user specific A-MAP 621, the AMS does not decode the A-MAPs (for example, HARQ feedback A-MAP 622, power control A-MAP 623 and assignment A-MAPs 624) remaining in the A-MAP region 620. As shown in FIG. 6, as the non-user specific A-MAP 621 including the broadcasting message indicator is transmitted in the A-MAP region 620, the idle mode AMS is able to quickly know whether the broadcasting message is transmitted by reading only the non-user specific A-MAP 621. Accordingly, it is possible to solve the problem of inefficient resource utilization due to unnecessary blind decoding of A-MAPs, performed by the idle mode AMS.

As described above, an AMS can check if a broadcasting message is included in the A-MAP region in a specific subframe so as to considerably decrease overhead generated when the entire specific subframe is decoded.

Figure 7:
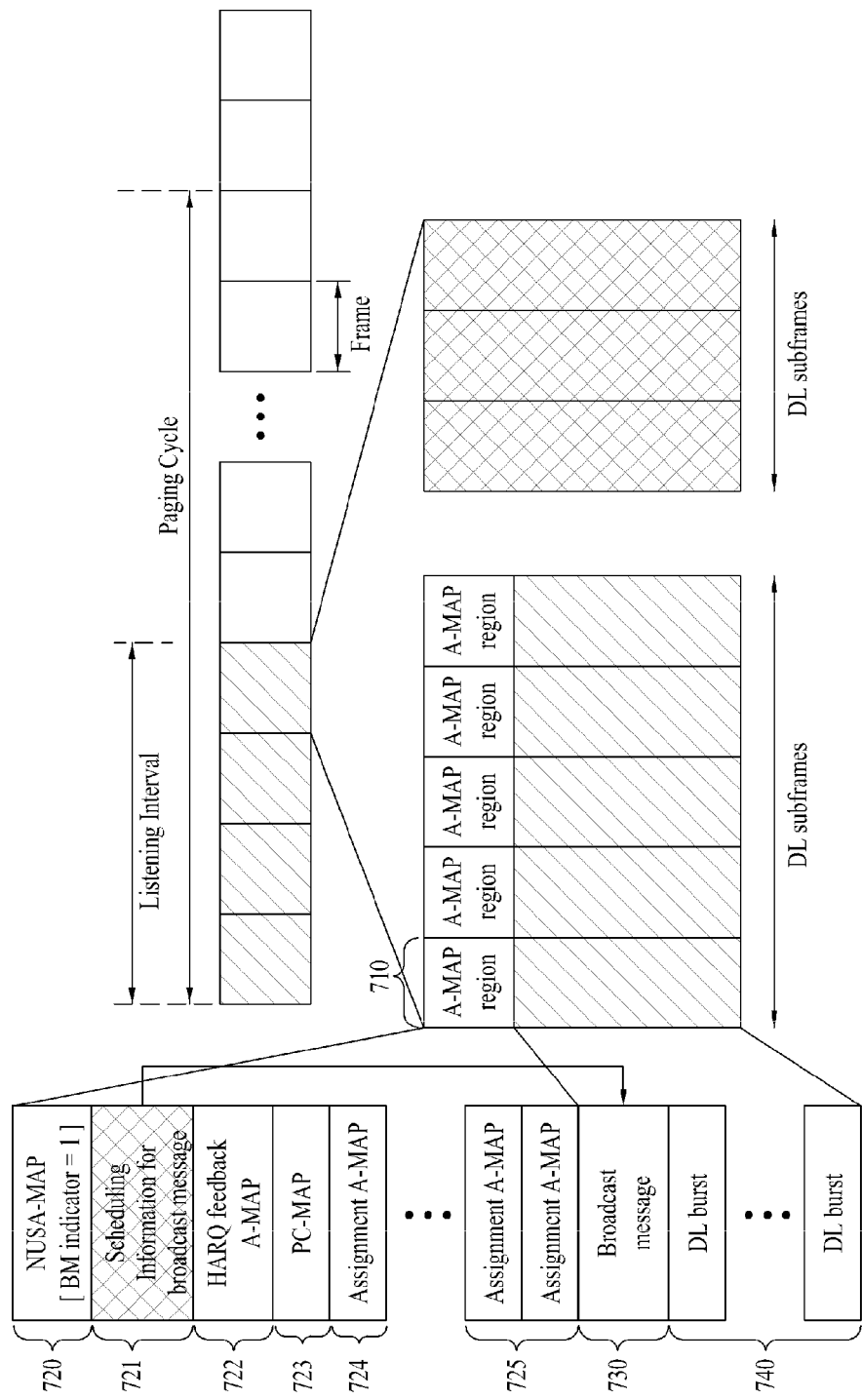
FIG. 7 shows another exemplary structure of the non-user specific A-MAP including the broadcasting message indicator.

FIG. 7 shows another exemplary structure of the non-user specific A-MAP including the broadcasting message indicator.

Referring to FIG. 7, an A-MAP region 710 of a specific subframe includes a non-user specific A-MAP 720, scheduling information 721 for a broadcasting message, a HARQ feedback A-MAP 722, a power control A-MAP 723, assignment A-MAPs 724, a broadcasting message 730, and downlink bursts 740.

If the broadcasting message indicator is set to 1, for example, in the non-user specific A-MAP 720, the broadcasting message indicator indicates that the broadcasting message is transmitted in the current subframe. Accordingly, the A-MAP region 710 of the corresponding subframe includes the scheduling information for broadcasting message transmission. At this time, the broadcasting message 730 may be located behind the assignment A-MAPs 724 or before the downlink bursts 740, as shown FIG. 7. Further, the scheduling information 721 for the broadcasting message may be located behind the non-user specific A-MAP 720.

The scheduling information 721 for broadcasting message transmission may be configured in an extended type of the non-user specific A-MAP 720 or in an independent form, as described above. Here, configuration in an extended type means configuration in the same physical structure (for example, a bit field size and transport format (e.g. modulation and coding selection (MCS), MIMO)) as the non-user specific A-MAP 720. The scheduling information 721 for broadcasting message transmission may include resource allocation information regarding the broadcasting message. The broadcasting message may include paging group ID information, traffic indication information, paging advertisement information, etc.

If the scheduling information 721 for broadcasting message transmission is configured in an extended type of a non-user specific A-MAP having the same physical structure as the non-user specific A-MAP 720 shown in FIG. 7, the scheduling information 721 occupies smaller bits compared to a case in which the scheduling information 721 has an assignment A-MAP IE form because the extended type does not have Cyclic Redundancy Checking (CRC) and the length of the scheduling information is equal to the length of the non-user specific A-MAP or is fixed to a predetermined value.

That is, in a case where the scheduling information 721 for broadcasting message transmission is transmitted in the extended type of the non-user specific A-MAP 720, the extended type of the non-user specific A-MAP 720 may have a size of 12 bits if the non-user specific A-MAP 720 is 12 bits.

If the scheduling information 721 for broadcasting message transmission is transmitted in the assignment A-MAP IE form, the scheduling information 721 must have minimum 56 bits. That is, if the size of a single assignment A-MAP is fixed to 56 bits and a broadcasting A-MAP IE is used, the scheduling information 721 for broadcasting message transmission must have a size of 56 bits.

Figure 8:
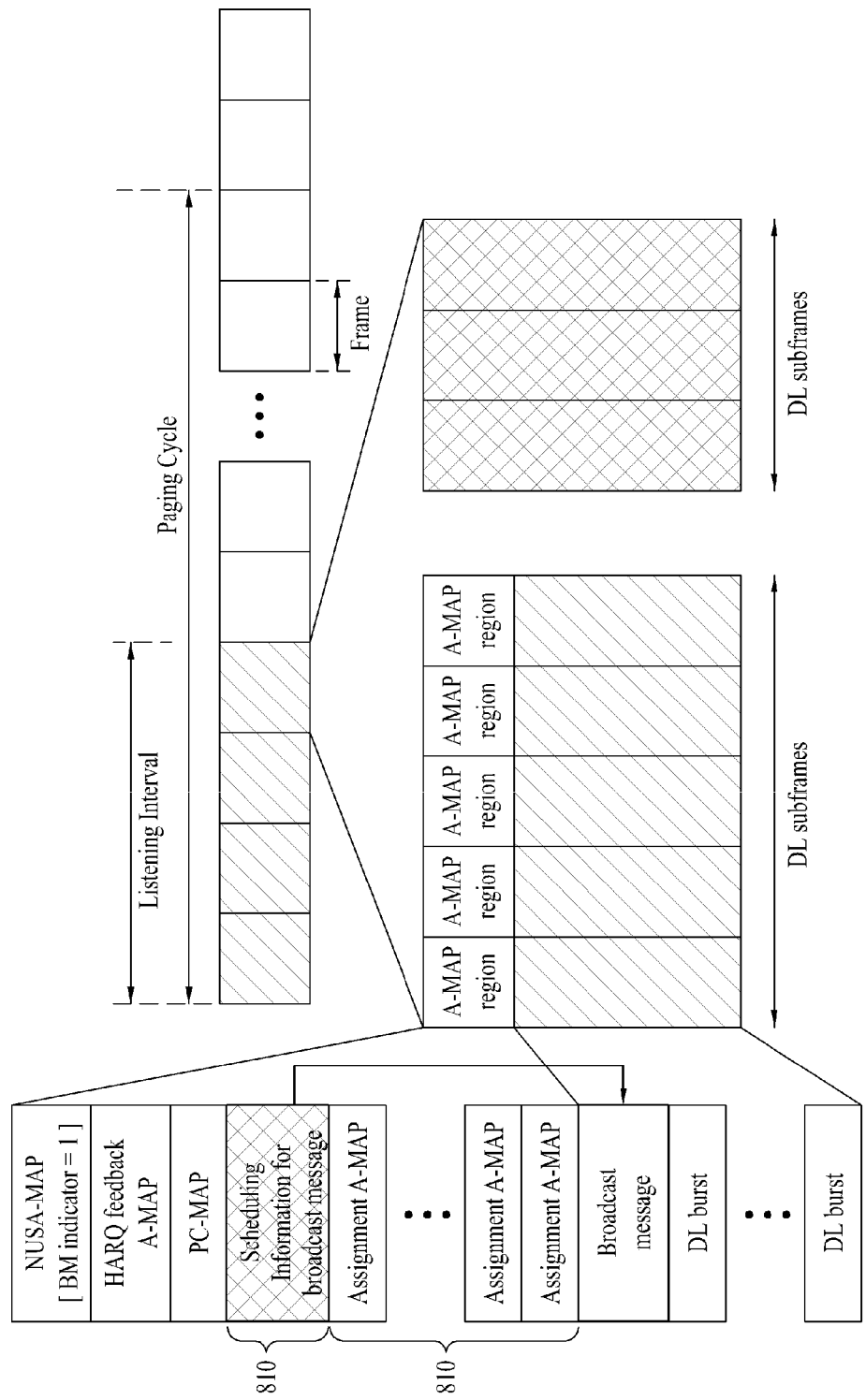
FIG. 8 shows an example of transmission of scheduling information regarding a broadcasting message in an assignment A-MAP form.

FIG. 8 shows an example of transmission of scheduling information regarding a broadcasting message in an assignment A-MAP form.

Referring to FIG. 8, scheduling information 810 regarding the broadcasting message may be transmitted in the assignment A-MAP IE form, distinguished from the technique relating to the structure of FIG. 7. In general, assignment A-MAP IEs 820 including CRC may have a size of 56 bits. Accordingly, the scheduling information 810 regarding the broadcasting message needs 56 bits when configured in the assignment A-MAP IE form. Here, the scheduling information 810 regarding the broadcasting message may be transmitted before the assignment A-MAP IEs 820, differently from the structure of FIG. 7.

In this manner, the base station can transmit scheduling information regarding a single broadcasting message in the extended type of the non-user specific A-MAP or in the assignment A-MAP form.

As described above, the scheduling information can be efficiently transmitted using various A-MAP structures according to the present invention. As the base station includes the broadcasting message indicator in the non-user specific A-MAP in the A-MAP region and transmits the non-user specific A-MAP to an AMS, the AMS is able to quickly know whether a broadcasting message is transmitted in the current subframe. Particularly, there is no need for an idle or sleep mode AMS to decode unnecessary A-MAPs if the AMS uses the broadcasting message indicator. Furthermore, when the broadcasting message indicator is set to 1, for example, the base station can transmit the scheduling information for broadcasting message transmission in the form of non-user A-MAP or assignment A-MAP IE. When only one broadcasting message is transmitted according to circumstances, resource utilization efficiency can be considerably improved by transmitting the scheduling information in an extended type of the non-user specific A-MAP instead of assignment A-MAP IE form.

Figure 9:
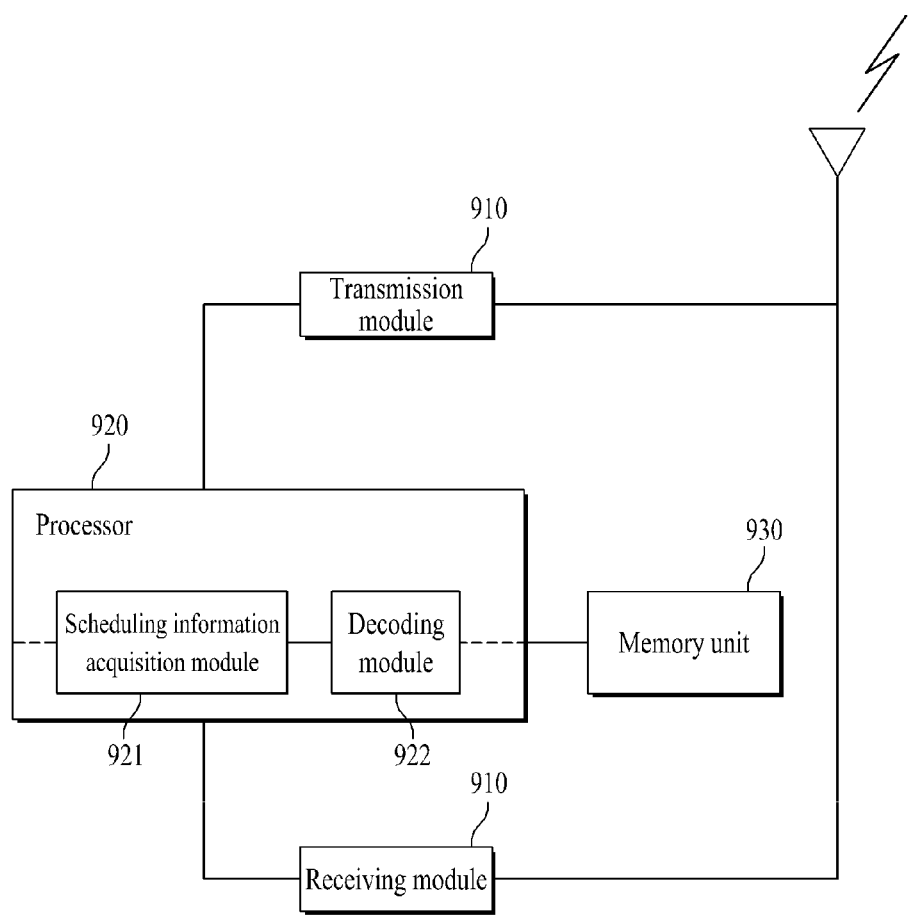
FIG. 9 is a block diagram of a AMS that performs a method of receiving control information according to the present invention.

FIG. 9 is a block diagram of a MS that performs the method of receiving control information according to the present invention.

Referring to FIG. 9, the MS includes a receiving module 910, a processor 920, and a transmission module 930.

The receiving module 910 receives various signals, data and information (for example, control information) from a base station. When a broadcasting message is transmitted in a specific subframe from the base station, the receiving module 910 receives a non-user specific A-MAP IE of the specific subframe including an indicator that indicates that the non-user specific A-MAP IE is configured in an extended form from the base station.

The processor 920 includes a scheduling information acquisition module 921 and a decoding module 922. The scheduling information acquisition module 921 may acquire scheduling information configured in an extended form of the non-user specific A-MAP IE based on the indicator that indicates that the non-user specific A-MAP IE received from the receiving module 910 is configured in the extended form of the non-user specific A-MAP IE. The decoding module 922 decodes a message, information, etc. received from the base station. The decoding module 922 may decode a broadcasting message using the scheduling information acquired from the extended non-user specific A-MAP part.

A memory unit 930 may store information processed by the MS through the processor 920, information received from the base station, etc. for a predetermined time. The memory unit 930 may be replaced with a configuration such as a buffer (not shown).

The transmission module 940 may transmit an uplink signal, information, data, etc. to the base station.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

Accordingly, the scope of the present invention should not be limited to the description of the embodiment, but defined by the accompanying claims and equivalents thereof.

INDUSTRIAL APPLICABILITY

The method of receiving control information and the MS device using the same according to the present invention are applicable to 3GPP LTE and IEEE 802.16m systems and industrially usable.

The invention claimed is:

1. A method of receiving control information at a mobile station (MS), the method comprising:
receiving, during a listening interval, a specific subframe having a non-user specific Advanced-MAP (A-MAP) Information Element (IE) which includes an indicator indicating whether the non-user specific A-MAP IE is extended or not, wherein the receiving occurs when the MS is in an idle mode or a sleep mode, and wherein the indicator is 1 bit; and
decoding the indicator;
wherein when the indicator indicates that the non-user specific A-MAP IE is extended, the method further comprises:
decoding a scheduling information from an extended part of the non-user specific A-MAP IE which indicates a location of a broadcast message included in the specific subframe;
decoding a first broadcast message in the specific subframe using the decoded scheduling information; and decoding a second broadcast message in the specific subframe using the decoded scheduling information when the first broadcast message is not included in the specific subframe;

wherein when the indicator indicates that the non-user specific A-MAP IE is unextended or when both of the first and second broadcast messages are not included in the specific subframe, the method further comprises:

moving onto a next subframe unless the specific subframe is the last subframe within the listening interval; and terminating the listening interval when the specific subframe is the last subframe within the listening interval.

2. The method according to claim 1, wherein a size and a transport format of the extended part of the non-user specific A-MAP IE are the same as a size and a transport format of the non-user specific A-MAP IE.

3. The method according to claim 1, wherein the scheduling information includes resource allocation information for the broadcast message.

4. The method according to claim 1, wherein the indicator is represented as a non-user specific A-MAP IE extension flag.

5. The method according to claim 1, wherein the first broadcast message comprises a paging message or a traffic indication message.

6. A mobile station (MS) comprising:

a receiver configured to receive, during a listening interval, a specific subframe having a non-user specific Advanced-MAP (A-MAP) Information Element (IE) which includes an indicator indicating whether the non-user specific A-MAP IE is extended or not, wherein the specific subframe is received when the MS is in an idle mode or a sleep mode, and wherein the indicator is 1 bit; and a processor configured to cooperate with the receiver to decode the indicator;

wherein when the indicator indicates that the non-user specific A-MAP IE is extended, the processor is further configured to decode a scheduling information from an extended part of the non-user specific A-MAP IE which indicates a location of a broadcast message included in the specific subframe, decode a first broadcast message in the specific subframe using the decoded scheduling information and decode a second broadcast message in the specific subframe using the decoded scheduling information when the first broadcast message is not included in the specific subframe, wherein when the indicator indicates that the non-user specific A-MAP IE is unextended or when both of the first and second broadcast messages are not included in the specific subframe, the processor is further configured to move onto a next subframe unless the specific subframe is the last subframe within the listening interval and terminate the listening interval when the specific subframe is the last subframe within the listening interval.

7. The MS according to claim 6, wherein a size and a transport format of the extended part of the non-user specific A-MAP IE are the same as a size and a transport format of the non-user specific A-MAP IE.

8. The MS according to claim 6, wherein the scheduling information includes resource allocation information for the broadcast message.

9. The MS according to claim 6, wherein the indicator is represented as a non-user specific A-MAP IE extension flag.

10. The MS according to claim 6, wherein the first broadcast message comprises a paging message or a traffic indication message.

* * * * *